(12) United States Patent
Wolf

(10) Patent No.: US 7,284,789 B2
(45) Date of Patent: Oct. 23, 2007

(54) CROSSMEMBER

(75) Inventor: Walter Wolf, Oppenweiler-Zell (DE)

(73) Assignee: BEHR GmbH & Co. KG, Stuttgart (DE)

( * ) Notice: Subject to any disclaimer, the term of this patent is extended or adjusted under 35 U.S.C. 154(b) by 36 days.

(21) Appl. No.: 10/512,942

(22) PCT Filed: May 2, 2003

(86) PCT No.: PCT/EP03/04610

§ 371 (c)(1),
(2), (4) Date: Nov. 1, 2004

(87) PCT Pub. No.: WO03/104061

PCT Pub. Date: Dec. 18, 2003

(65) Prior Publication Data

US 2005/0253423 A1  Nov. 17, 2005

(30) Foreign Application Priority Data

May 4, 2002 (DE) .............................. 102 20 025

(51) Int. Cl.
*B60J 7/00* (2006.01)
(52) U.S. Cl. .................. 296/208; 180/90; 296/193.02; 296/70
(58) Field of Classification Search ................ 296/208, 296/192, 193.02, 70; 180/90
See application file for complete search history.

(56) References Cited

U.S. PATENT DOCUMENTS

| 4,733,739 | A | * | 3/1988 | Lorenz et al. ................ 180/90 |
|---|---|---|---|---|
| 5,061,009 | A |   | 10/1991 | Harasaki et al. |
| 5,088,571 | A | * | 2/1992 | Burry et al. ................... 180/90 |
| 5,311,960 | A | * | 5/1994 | Kukainis et al. ............... 296/70 |
| 5,312,133 | A | * | 5/1994 | Pietila et al. .................. 180/90 |
| 5,354,114 | A | * | 10/1994 | Kelman et al. ............. 296/208 |
| 5,549,344 | A | * | 8/1996 | Nishijima et al. ............. 296/70 |
| 5,564,515 | A | * | 10/1996 | Schambre ..................... 180/90 |
| 5,580,122 | A | * | 12/1996 | Muehlhausen ......... 296/193.02 |
| 5,673,964 | A | * | 10/1997 | Roan et al. .................. 296/208 |
| 5,676,216 | A | * | 10/1997 | Palma et al. ................... 180/90 |
| 5,678,877 | A | * | 10/1997 | Nishijima et al. ........... 296/208 |
| 5,685,595 | A | * | 11/1997 | Nishijima et al. ............. 296/70 |
| 5,707,100 | A | * | 1/1998 | Suyama et al. ............. 296/208 |
| 5,979,965 | A | * | 11/1999 | Nishijima et al. .......... 296/208 |
| 5,997,078 | A | * | 12/1999 | Beck et al. .................. 296/208 |
| 6,176,544 | B1 | * | 1/2001 | Seksaria et al. ........ 296/203.02 |
| 6,186,887 | B1 | * | 2/2001 | Dauvergne .................. 296/208 |
| 6,196,588 | B1 | * | 3/2001 | Sugawara ..................... 180/90 |
| 6,231,116 | B1 | * | 5/2001 | Naert et al. ................. 296/208 |
| 6,234,569 | B1 | * | 5/2001 | Derleth et al. .............. 296/208 |
| 6,250,678 | B1 | * | 6/2001 | Yoshinaka et al. ...... 296/193.02 |
| 6,273,495 | B1 | * | 8/2001 | Haba et al. .................. 296/208 |
| 6,276,740 | B1 | * | 8/2001 | Mellor et al. ................. 296/72 |

(Continued)

FOREIGN PATENT DOCUMENTS

DE   690 09 002 T2   9/1994

(Continued)

*Primary Examiner*—Kiran B. Patel
(74) *Attorney, Agent, or Firm*—Foley & Lardner LLP

(57) ABSTRACT

The invention relates to a crossmember for a motor vehicle. Said crossmember (1) is composed of a base body (2) and a reinforcement (3) and has at least one wall (22) running transversally to the crossmember (1).

13 Claims, 12 Drawing Sheets

U.S. PATENT DOCUMENTS

| | | | |
|---|---|---|---|
| 6,378,934 B1 * | 4/2002 | Palazzolo et al. | 296/208 |
| 6,382,695 B1 | 5/2002 | Decome | |
| 6,391,470 B1 * | 5/2002 | Schmieder et al. | 428/598 |
| 6,394,527 B2 * | 5/2002 | Ohno et al. | 296/193.02 |
| 6,409,590 B1 * | 6/2002 | Suzuki et al. | 296/70 |
| 6,422,633 B2 * | 7/2002 | Neuss et al. | 296/208 |
| 6,474,716 B2 * | 11/2002 | Shikata et al. | 296/70 |
| 6,488,330 B2 * | 12/2002 | Hedderly | 296/70 |
| 6,502,897 B2 * | 1/2003 | Neuss et al. | 296/208 |
| 6,520,849 B1 * | 2/2003 | Greenwald et al. | 296/208 |
| 6,523,878 B2 * | 2/2003 | Scheidel | 296/70 |
| 6,554,352 B2 * | 4/2003 | Nagy | 296/208 |
| 6,582,005 B2 * | 6/2003 | Takano | 296/208 |
| 6,582,011 B2 * | 6/2003 | Palazzolo et al. | 296/208 |
| 6,676,202 B2 * | 1/2004 | Brancheriau | 296/208 |
| 6,705,671 B1 * | 3/2004 | Glovatsky et al. | 296/193.02 |
| 6,705,672 B2 * | 3/2004 | Shikata et al. | 296/208 |
| 6,761,395 B2 * | 7/2004 | Charbonnel | 296/208 |
| 6,767,041 B2 * | 7/2004 | Shiono | 296/70 |
| 6,783,173 B2 * | 8/2004 | Nakamura et al. | 296/208 |
| 6,802,559 B2 * | 10/2004 | Yoshihara et al. | 296/208 |
| 6,834,913 B2 * | 12/2004 | Reed et al. | 296/208 |
| 6,857,681 B2 * | 2/2005 | Nakajima | 296/70 |
| 6,872,134 B2 * | 3/2005 | Mills | 454/121 |
| 6,877,787 B2 * | 4/2005 | Ito et al. | 296/208 |
| 6,921,127 B2 * | 7/2005 | Feith et al. | 296/208 |
| 6,942,910 B2 * | 9/2005 | Roberts et al. | 296/208 |
| 6,945,576 B1 * | 9/2005 | Arentzen | 296/208 |
| 6,955,394 B1 * | 10/2005 | Reddig et al. | 296/208 |
| 6,988,764 B2 * | 1/2006 | Matsutani | 296/193.02 |
| 2005/0253423 A1 | 11/2005 | Wolf | |

FOREIGN PATENT DOCUMENTS

| | | |
|---|---|---|
| DE | 44 09 081 C1 | 4/1995 |
| DE | 196 26 441 A1 | 1/1998 |
| DE | 299 16 466 U1 | 12/1999 |
| DE | 100 46 120 A1 | 4/2004 |
| EP | 0 796 769 A1 | 9/1997 |
| EP | 1 136 345 A1 | 9/2001 |
| FR | 2 783 489 A1 | 3/2000 |
| WO | WO 03/104061 A2 | 12/2003 |

* cited by examiner

CROSSMEMBER

BACKGROUND OF THE INVENTION

The invention relates to a crossmember for a motor vehicle.

An aim of motor vehicle manufacturers is to reduce the weight of motor vehicles. For this reason, DE 100 46 120 A1 describes a component of hybrid construction for a motor vehicle, in particular a crossmember for the cockpit region, in which the crossmember is designed as a lightweight component with a shell-shaped basic body and with reinforcing ribs consisting of molded-on plastic. In this case, at least one duct is entirely or partially injection molded together with the reinforcing ribs in the interior of the basic body. The duct serves, for example, for conducting air of an air conditioning system. However, a component of this type leaves something to be desired.

Starting from this prior art, it the object of the invention to provide an improved crossmember.

SUMMARY OF THE INVENTION

The invention provides a crossmember for a motor vehicle, in particular for the cockpit region, in which at least one wall running transversely with respect to the crossmember is provided. In particular, a wall is provided at the ends of the crossmember (A-pillar connection), in the region of the connection for the airbag, steering system and tunnel strut and wherever else holders are required.

A passage is preferably provided between the wall and basic body. In particular, an air duct which is part of an air conditioning system can run through the passage, but also a duct for the wiping water for the headlights or the windshield, cooling water, oil, compressed air or the like, if appropriate also for the protected laying of cables, petrol lines, oil lines, compressed air lines or the like may also be provided. The air duct may be inserted or injection molded, for example. The insertion or injection molding of the air duct affords the advantage of enabling plastics which are more reasonably priced to be used, since the static is absorbed by the other elements, in particular by the basic body, the walls and optionally provided reinforcements, which are manufactured in particular from metal.

The wall preferably consists of a metal sheet, in particular of steel, aluminum of magnesium, and has connections at which the crossmember can be attached to an A-pillar or the like or at which other elements can be attached to the crossmember. As an alternative, other metals, in particular high-strength metals, may also be used.

The wall preferably forms part of the elements which are to be attached to the crossmember, such as, for example, the A-pillar connection, the steering system, the support for the scuttle, the holder for the gearshift mechanism, electronic box, glove compartment, airbag, knee bag, instrument panel, the channel strut, the pedal block and the central consoles. In this case, the walls or their functions are integrated directly in the attachment element or the wall entirely or partially takes on the functions of the attachment elements, for example forms parts of an airbag housing. In this case, the attachment elements and the walls may also, however, be of multi-part design. This enables a further reduction in weight to be achieved.

The crossmember, for reinforcement, preferably has ribs, rib elements and/or tension elements and/or compression elements which are attached to the basic body. In this case, the reinforcement is preferably a cast part, sintered part or forged part which is manufactured, in particular, from steel, aluminum or magnesium. The wall may, for example, also be integrated directly in the reinforcement, i.e. may be part of the reinforcement. In particular, the reinforcing elements are arranged at angle of 45° +/−10° with respect to the longitudinal direction of the crossmember if the crossmember is subject to bending and torsional loading.

According to one alternative embodiment for pure bending loading, the crossmember, for reinforcement, has ribs, rib elements and/or tension elements which are attached to the basic body and are arranged at angle of 0° or 90° with respect to the longitudinal direction of the crossmember.

According to one preferred embodiment, the rib elements have a V-shaped design and are preferably attached to one another in such a manner that they are fixed with the ends of their limbs to the basic body and with their central regions to each other. As an alternative, however, elements which correspond to a plurality of rib elements connected in such a manner may also be provided.

BRIEF DESCRIPTION OF THE DRAWINGS

The invention is explained in detail below using a plurality of exemplary embodiments and with reference to the drawing, in which.

DETAILED DESCRIPTION OF PREFERRED EMBODIMENTS

Figure 12:
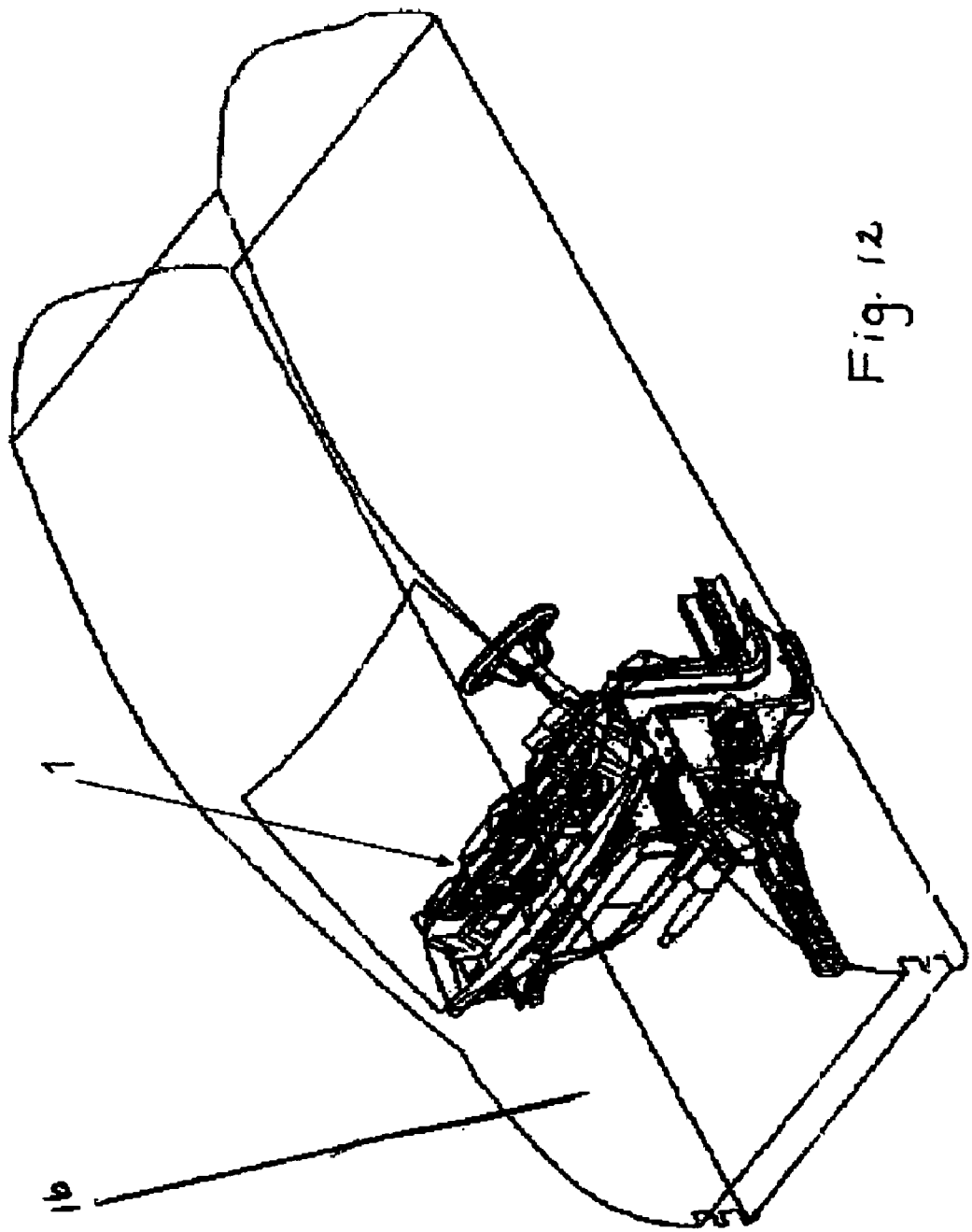
FIG. 12 illustrates the placement of the crossmember according to the invention in a typical, schematically shown vehicle body.

FIG. 12 illustrates the placement of crossmember 1 of the invention in the cockpit region of a vehicle body 16.

Figure 1:
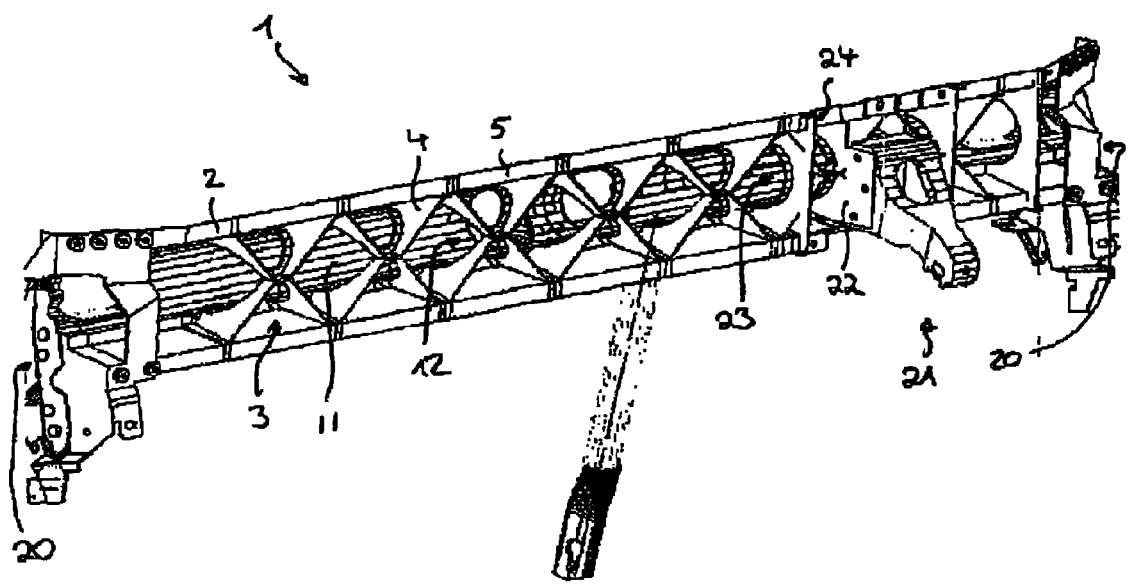
FIG. 1 shows a perspectively illustrated crossmember according to the first exemplary embodiment.
Figure 4:
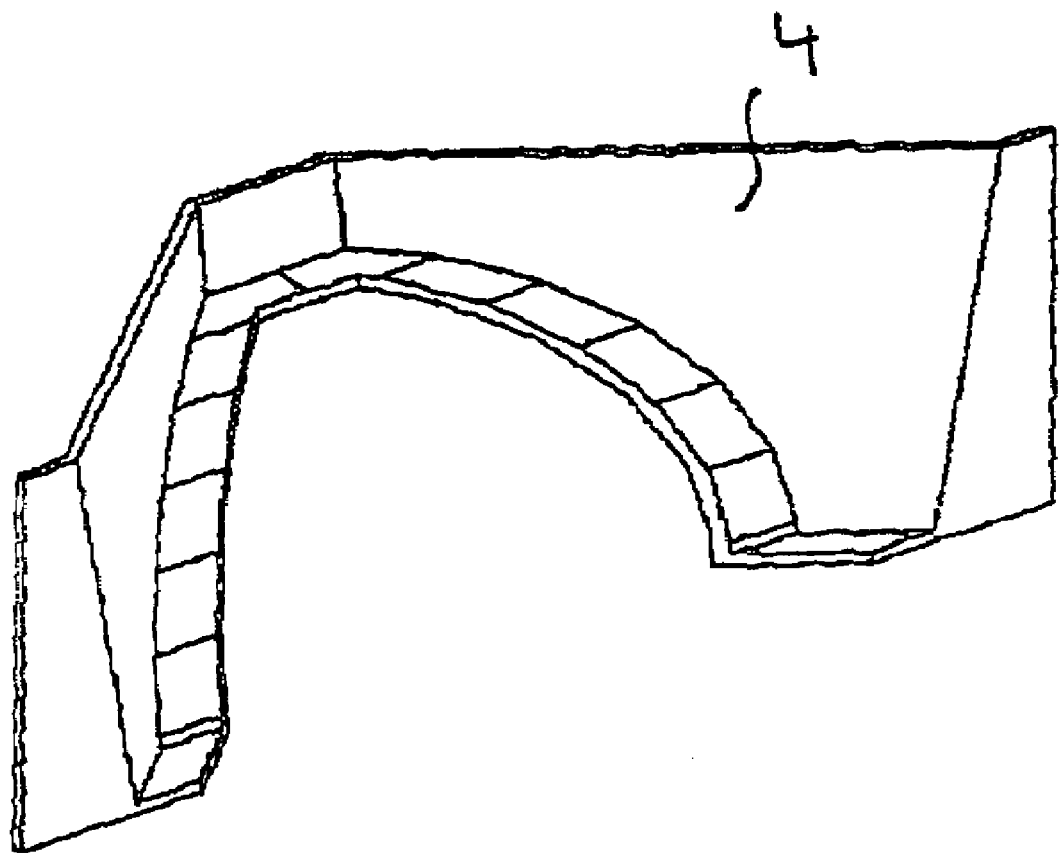
FIG. 4 shows an illustration of a rib element according to FIG. 1.
Figure 5:
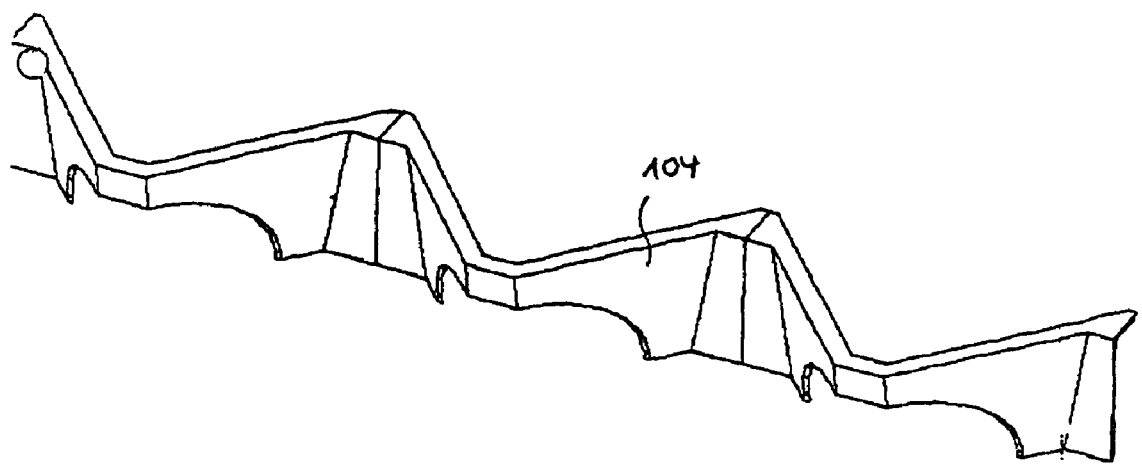
FIG. 5 shows an illustration of a first variant of a rib element.

FIG. 1 shows a crossmember 1 according to the first exemplary embodiment, which is designed as a crossmember for a motor vehicle. The crossmember 1 has a basic body 2, which is formed from a sheet-metal bent part, and a ribbing 3 which is joined onto this basic body 2 and is likewise manufactured from sheet-metal bent parts, referred to below as V-shaped rib elements 4. The connection between the ribbing 3 and the basic body 2 takes place, for example, by means of punch rivets. One rib element 4 is illustrated in simplified form in FIG. 4. The rib elements 4 are arranged in the basic body 2 in such a manner that they are fixed with the ends of their limbs to the basic body 2 and with their central regions to each other. In this case, the rib element 4 form a pattern, the individual lines of which, which are formed by the ribbing 3, are at an angle of approx. 45° with respect to the longitudinal direction of the crossmember 1. According to a first variant of the ribbing 3 that is illustrated in FIG. 5, a plurality of individual rib elements are of integral design or are designed such that they are connected fixedly to one another, thus providing relatively large rib elements 104 which, however, are joined together in a manner essentially corresponding to the rib elements 4 and the function of which corresponds to that of the rib elements 4.

Figure 2:
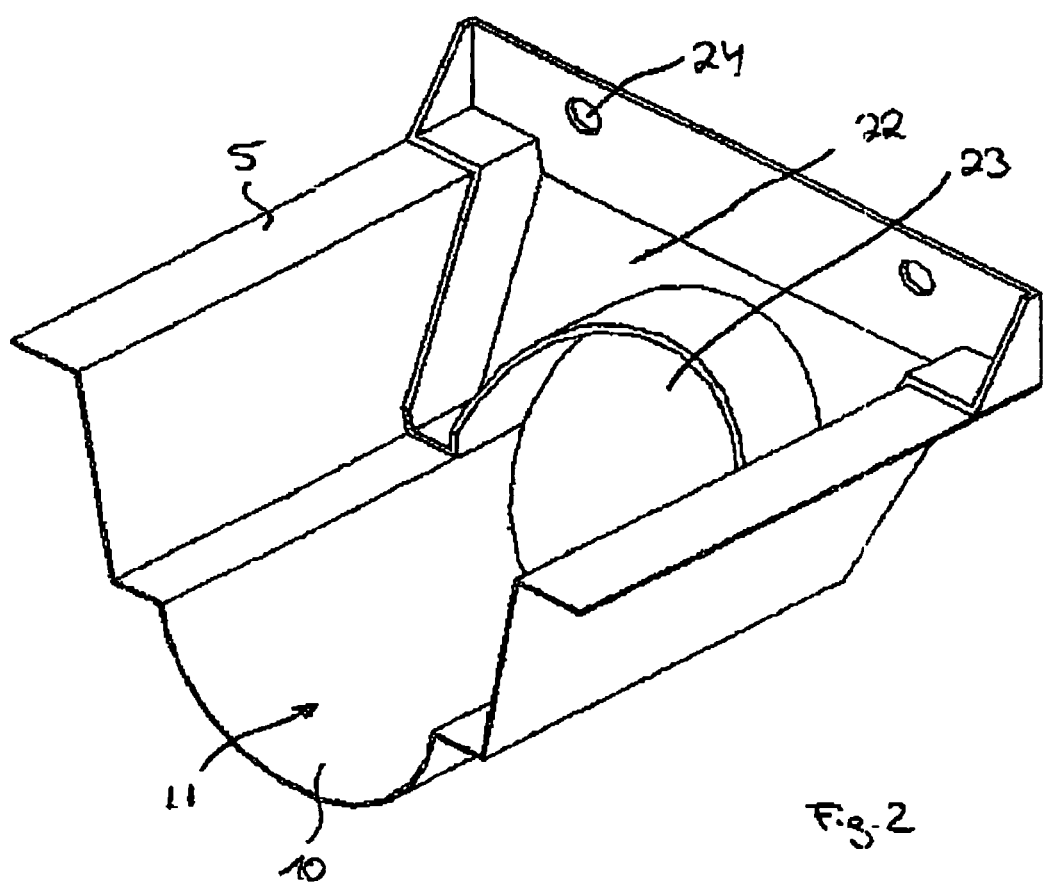
FIG. 2 shows an illustration of a wall in a basic body according to the first exemplary embodiment.

As is apparent in particular in FIG. 2, the basic body 2 has an essentially U-shaped profile, with the two ends being bent outward and forming an edge region 5. For reinforcement of the outwardly pointing edge region 5 the ends may also first of all be bent outward and then a subregion of the ends may be bent back again, with the result that two sheet-metal layers running parallel to each other are provided in the edge region 5. The lower region of the basic body 2 has a channel-shaped depression 10 which serves for the insertion of an air duct 11. The V-shaped rib elements 4 have corresponding cutouts 12, pointing toward the basic body 2, with the result that the air duct 11 can have a circular cross section.

Walls 22 which are formed by metal sheets and run transversely with respect to the longitudinal direction of the basic body 2 are provided at the ends 20 of the basic body 2 and in the region of the steering-system connection 21. One wall 22 is illustrated in simplified form in FIGS. 2 and 3. The walls 22 also have cutouts 23, corresponding to the rib elements 4, with the result that the air duct 11 can easily be inserted into the crossmember 1.

Connections 24 are provided on the walls 22. These connections 24 serve to connect the crossmember 1 to the A-pillars of the motor vehicle or to connect the steering system of the motor vehicle (cf. FIG. 2).

Figure 3:
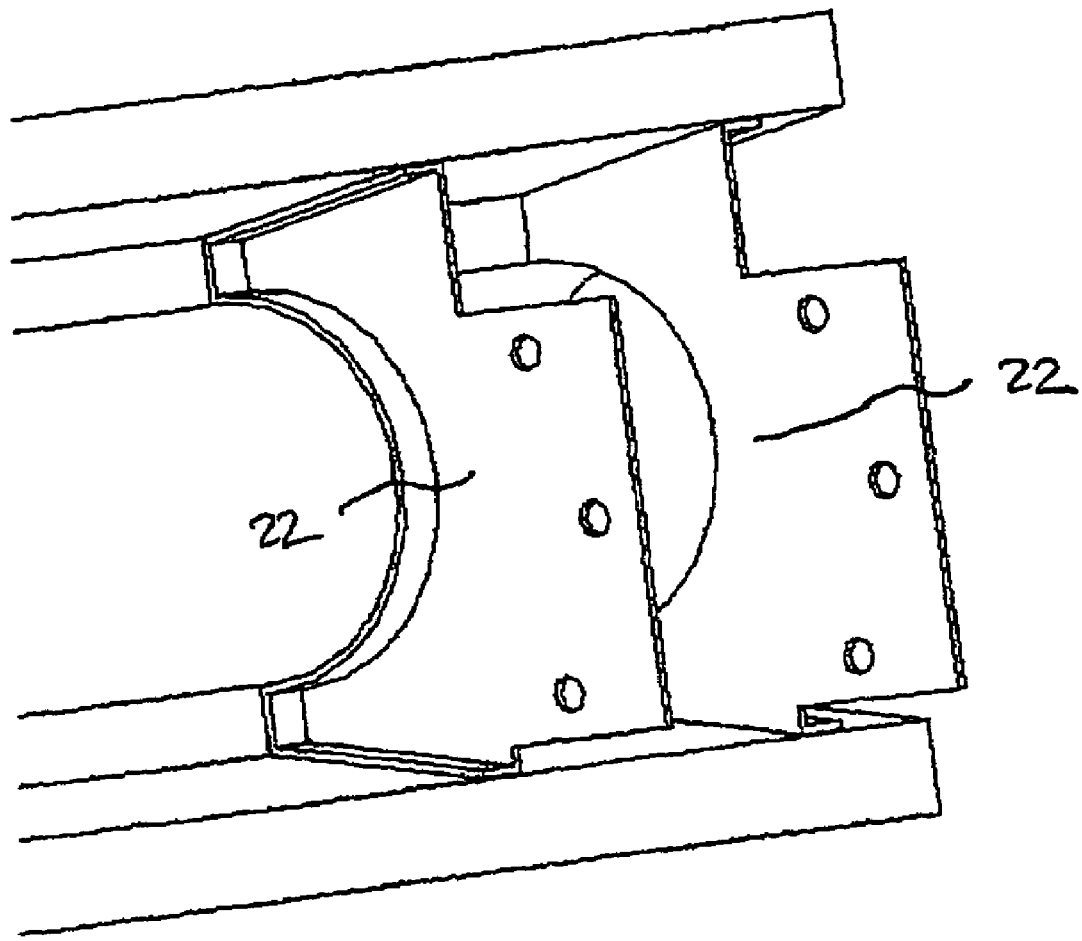
FIG. 3 shows an illustration of a variant to FIG. 2.

As illustrated in FIGS. 1 and 3, a plurality of walls 22 may also be arranged parallel to one another.

The fastening of the rib elements 4 may take place in any desired manner, for example by means of pressure joining, welding, bonding, snap fasteners, clamping or foaming into place.

According to an alternative embodiment which is not illustrated in the drawing, the basic body consists of a profiled metal sheet which is formed in a U-shape and, corresponding to the first exemplary embodiment, is provided with rib elements.

Figure 6:
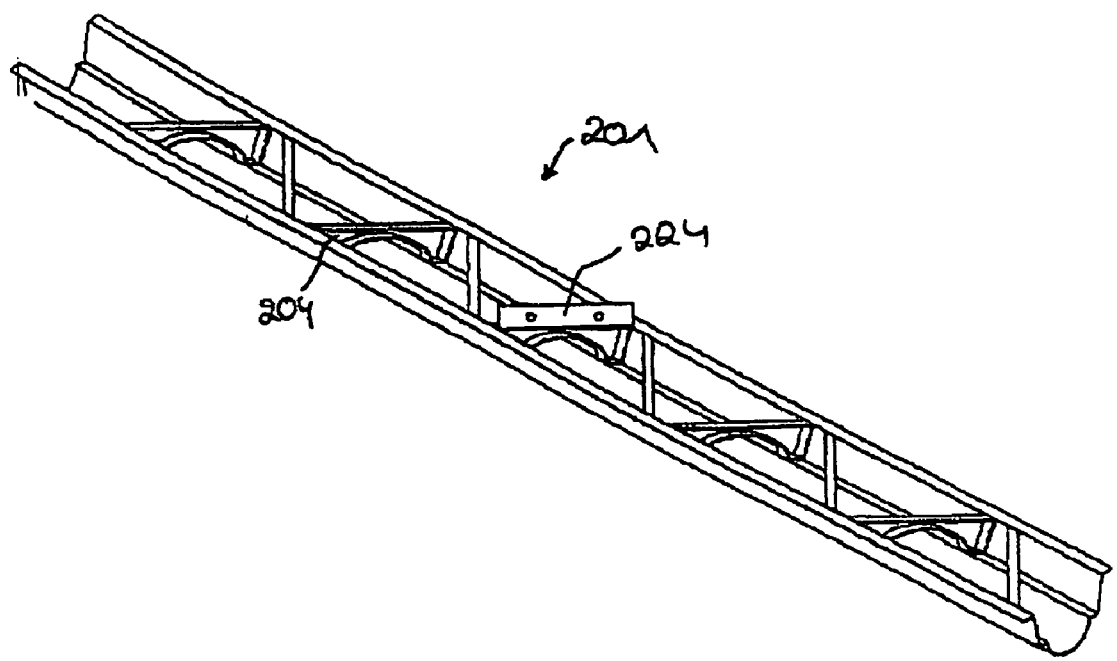
FIG. 6 shows an illustration of a second variant of the ribbing.

A second exemplary embodiment is briefly described below with reference to FIG. 6, in which parts which are identical or act in an identical manner bear reference numbers which are higher by 200 than in the first exemplary embodiment.

According to this exemplary embodiment, instead of the V-shaped rib elements 4 straight rib elements 204 are provided in the crossmember 201, said rib elements running in each case at an angle of approx. 45° transversely over the crossmember 201 and not intersecting. According to the present exemplary embodiment, the function of a wall is taken on by a rib element 204. However, the walls may also be arranged in accordance with the first exemplary embodiment. Thus, according to the exemplary embodiment, a connection 224 is provided directly on a rib element 204 serving as a wall.

Figure 7:
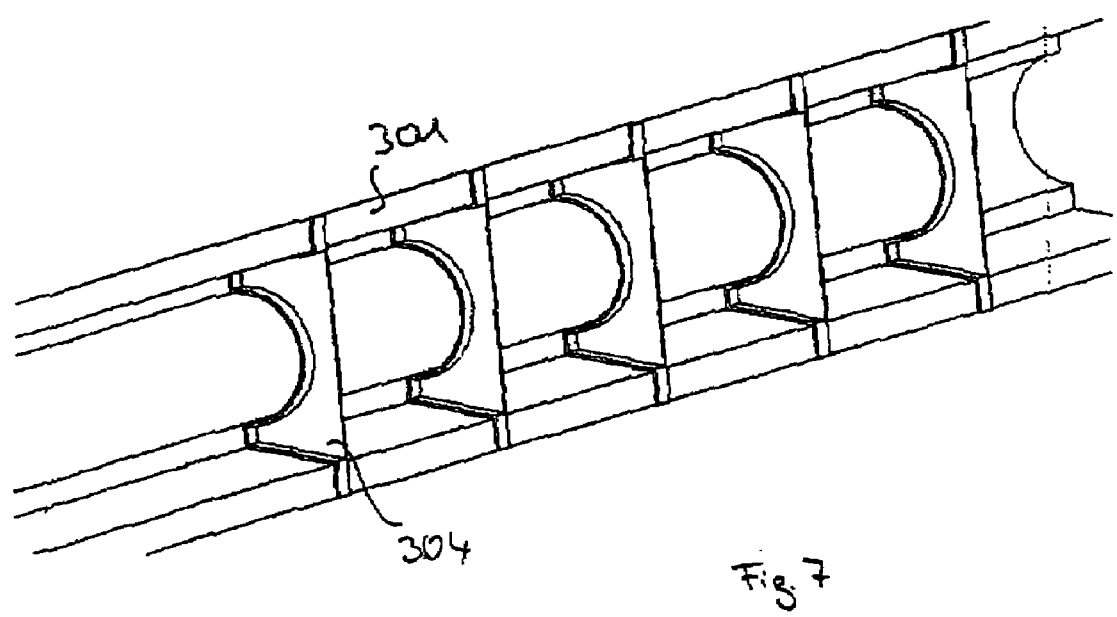
FIG. 7 shows an illustration of a third variant of the ribbing.
Figure 8:
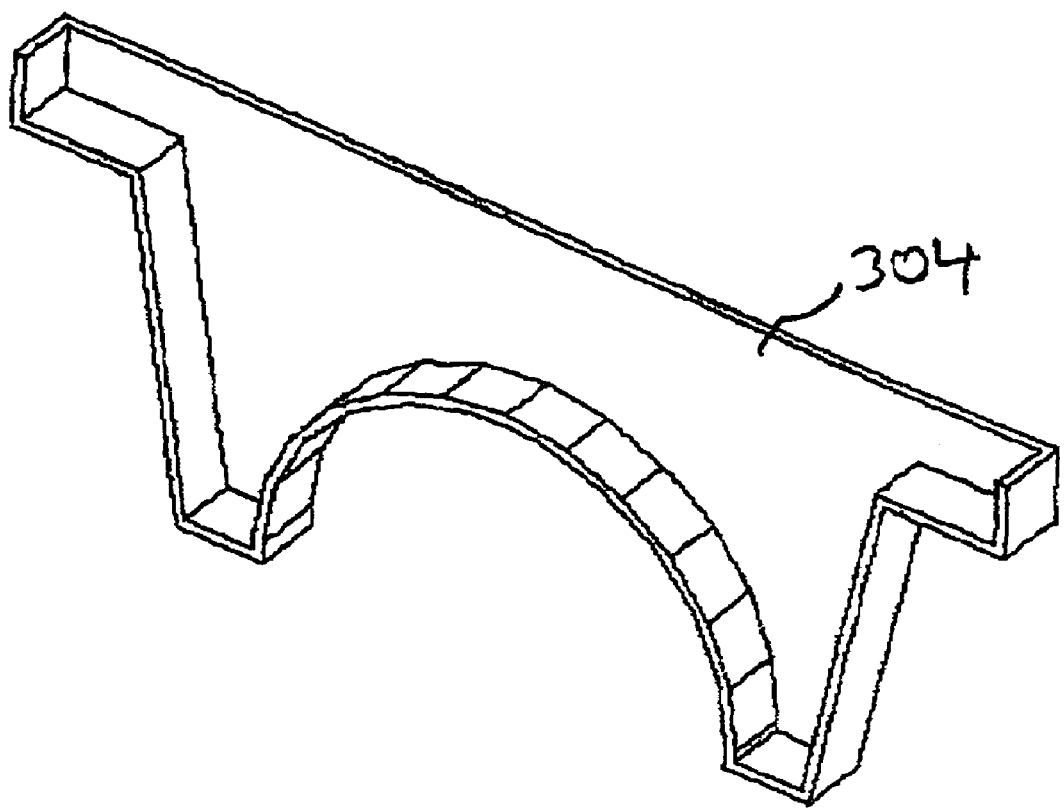
FIG. 8 shows an illustration of part of the ribbing from FIG. 7.

FIGS. 7 and 8 show a third exemplary embodiment having rib elements 304 running perpendicularly with respect to the longitudinal axis of the crossmember 301, this arrangement being suitable in particular for pure bending loading. In this case, the rib elements 304 may also fulfill the function of the walls at the same time.

Figure 9:
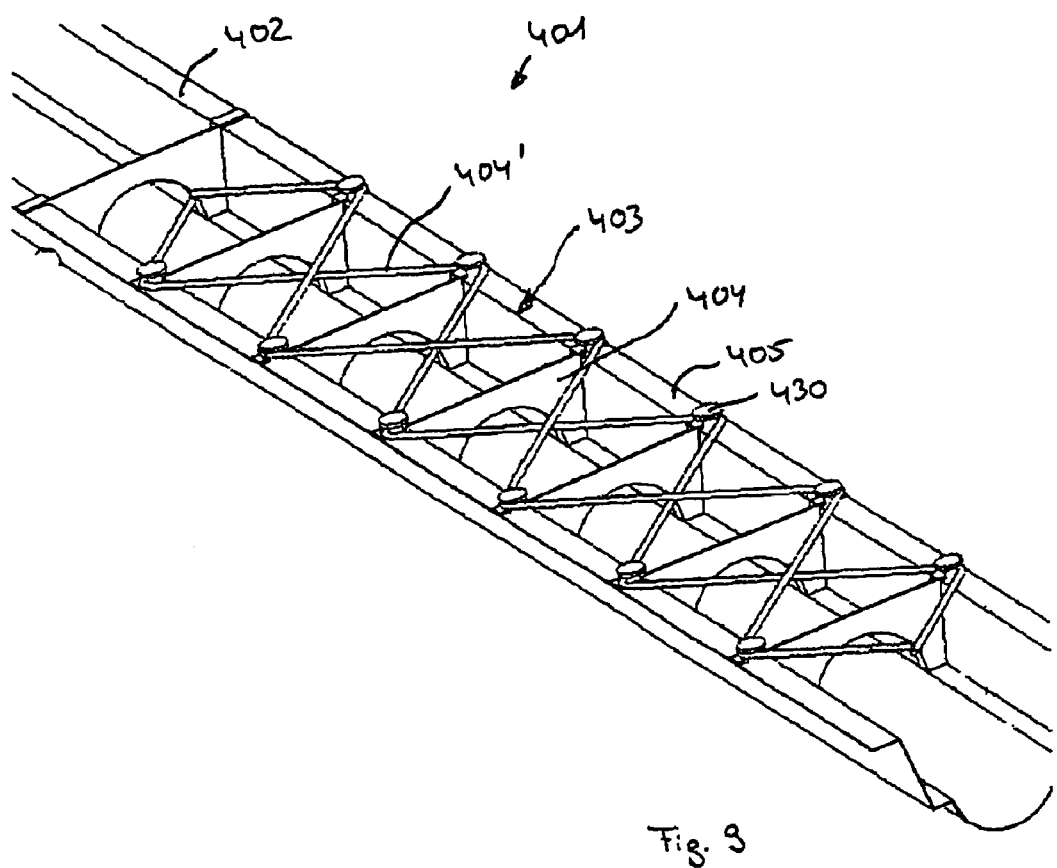
FIG. 9 shows an illustration of a fourth variant of the ribbing.

According to the fourth exemplary embodiment illustrated in FIG. 9, as the ribbing 403 for the crossmember 401, rib elements 404 which correspond to those of the preceding exemplary embodiment are provided and, in addition, wires 404' are stretched, with two wires 404' intersecting. The deflection of the wires 404' on the edge region 405 of the basic body 402 takes place by means of bolts 430. As an alternative, prongs, hook-shaped elements or any other desired fastening or deflecting devices may be provided. Instead of wires, cables or other tensioning means may also be used. Furthermore, the use of pressure transmission means, for example of rods, is possible. In this case, the rib element 404 may be omitted in order, for example, to save on weight and costs.

The angle at which the wires 404' are stretched with respect to the longitudinal direction of the crossmember 401 is approx. 45°, in particular 45+/−10°.

Under the wires 404', in the regions to be reinforced, i.e. in particular in the regions in which connections are to be provided, walls with connections (not illustrated) are provided in accordance with the first exemplary embodiment. In this case, the walls may also protrude over the wires 404'. The wires 404' may also be fastened, for example, in the region of the walls or to the walls. The design of the walls corresponds essentially to the design of the walls 4 of the first exemplary embodiment, with the result that, in turn, an air duct 411 can be accommodated in the crossmember 401. The air duct 411 may, for example, be a plastic blow-molded part which is inserted before the assembly, but it may also be inserted subsequently.

Figure 10:
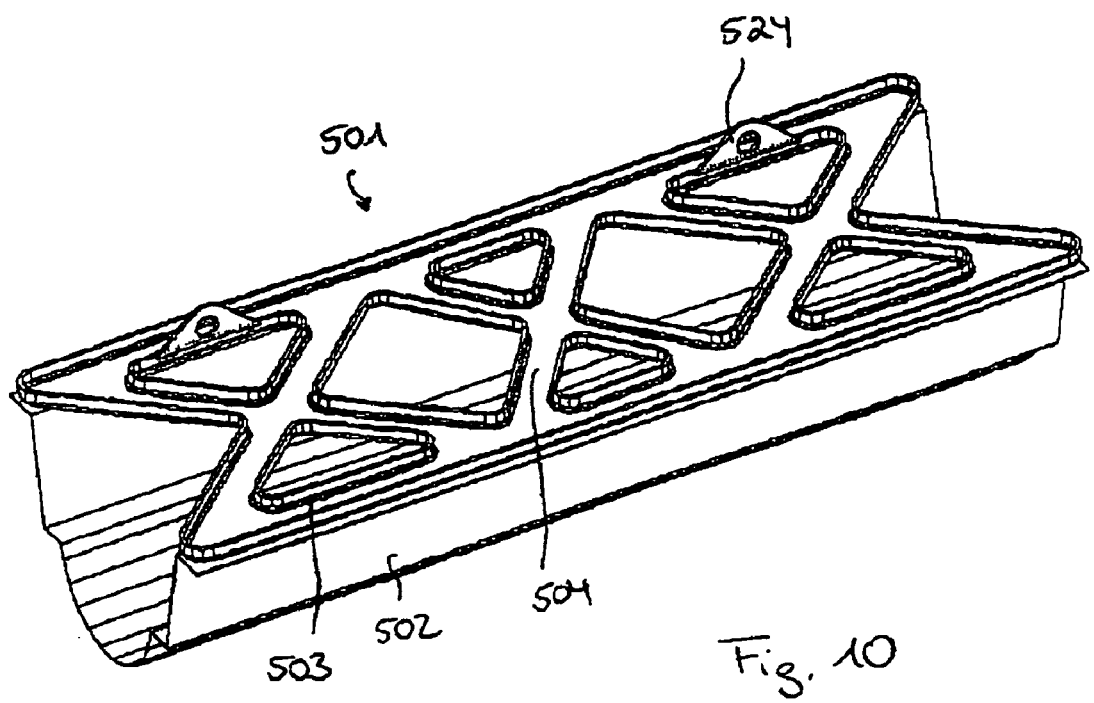
FIG. 10 shows an illustration of a fifth variant of the ribbing.

FIG. 10 shows a further exemplary embodiment according to which the ribbing 503 is formed by rib elements 504 in the manner of a cover which is placed onto the basic body 502 and has struts which run obliquely with respect to the longitudinal direction of the crossmember 501 and have reinforced edge regions which take on the function of the ribs. In this case, walls to which elements which are to be connected to the crossmember 501 can be attached or with the aid of which the crossmember 501 can be fixed in place are not provided on the basic body 502, since devices, i.e. connections 524, corresponding to the walls are provided directly on the rib elements 504. As an alternative, devices corresponding to the walls may be joined to the rib elements 504. In principle, it is also possible to provide additional walls. The reinforced edge regions which are bent upward in FIG. 10 may also be bent inward, which reduces the constructional space required.

Figure 11:
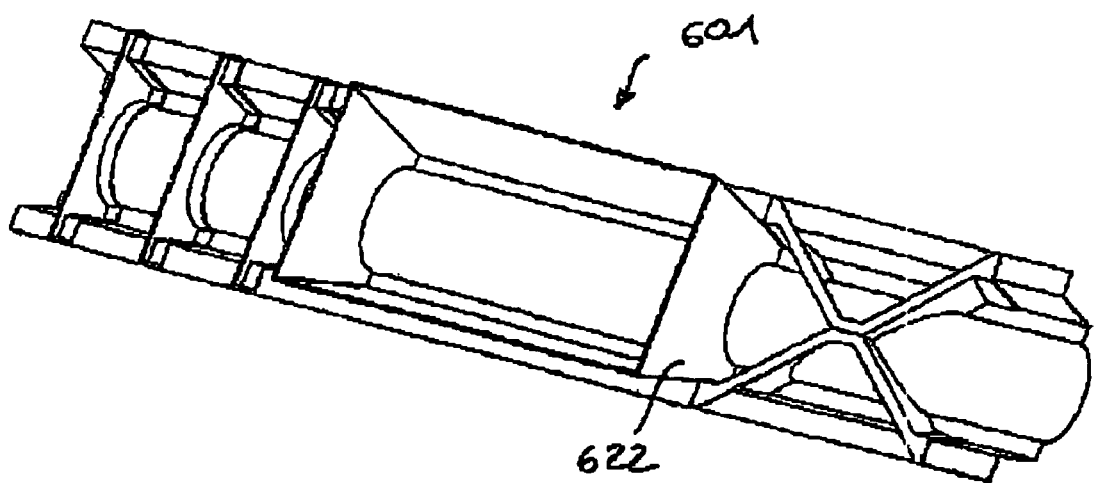
FIG. 11 shows an illustration of a further exemplary embodiment.

FIG. 11 shows a further exemplary embodiment of the present invention, according to which two walls 622 are provided in the crossmember 601, said walls being connected to each other in the longitudinal direction of the crossmember 601 in such a manner that they take on the function of a housing, in the present case the function of the airbag housing.

LIST OF REFERENCE NUMBERS 1, 201, 301, 401, 501, 601 Crossmember
2, 402; 502 Basic body
3, 403, 503 Ribbing
4, 104, 204, 304, 404; 504 Rib element
5, 405 Edge region
10 Depression
11 Air duct 12 Cutout
20 End
21 Steering-system connection
22, 622 Wall
23 Cutout
24, 224, 524 Connection
104 Wire
130 Bolt
404' Wire

The invention claimed is:

1. A crossmember for a motor vehicle, comprising
   a basic body having an elongated shape adapted for installation across a forward portion of a motor vehicle passenger compartment, the basic body having a shell of bent sheet metal forming an internal volume and a longitudinal axis extending along the elongated shape;
   a reinforcement member comprising a plurality of rib elements that are attached to the basic body within the internal volume along the longitudinal length of the basic body and at least one wall member positioned within the internal volume of the basic body and extending at an angle with respect to the longitudinal axis of the crossmember basic body,
   wherein the wall member is manufactured from a metal sheet, is connected to the basic body and comprises at least one connection for connecting the crossmember to a portion of the motor vehicle.

2. The crossmember as claimed in claim 1, wherein the at least one wall member is configured in such a way as to form a passage between the wall member and the basic body.

3. The crossmember as claimed in claim 2, wherein the rib elements are formed of sheet metal and comprise a three-dimensional pattern that forms a passage between the ribs and the basic body.

4. The crossmember as claimed in claim 3, wherein the pattern of the rib elements forms intersections at an angle of 45° +/−10° with respect to the longitudinal direction of the crossmember.

5. The crossmember as claimed in claim 3, wherein the rib elements are V-shaped and are fixed to the basic body at the ends of their V-limbs and to each other at their central vertex regions.

6. The crossmember as claimed in claim 3, further comprising an air duct arranged between the basic body and the reinforcement member, the air duct passing through the passages formed between the at least one wall member and the basic body and through passage formed between the rib elements pattern and the basic body.

7. The crossmember as claimed in claim 6, wherein the airduct is made of a plastic material.

8. The crossmember as claimed in claim 1, wherein the reinforcement member further comprises additional elements selected from the group consisting of tension elements, compression elements and combinations thereof.

9. The crossmember as claimed in claim 1, wherein the basic body comprises substantially a U-shape in its cross-section transverse to the longitudinal axis.

10. The crossmember as claimed in claim 9, wherein the two longitudinal edges of the U-shape are bent outward forming an edge region extending longitudinally along each side of the U-shape.

11. The crossmember as claimed in claim 10, wherein the at least one wall member comprises a flanged wall portion that extends parallel to the two edge regions of the basic body, and the at least one wall member is secured to the basic body at the flanged wall portion.

12. The crossmember as claimed in claim 1, wherein the basic body comprises a channel-shaped depression for the insertion of an airduct.

13. The crossmember as claimed in claim 2, wherein the reinforcement member of the crossmember comprises at least two of said wall members positioned within the internal volume of the basic body and extending at an angle with respect to the longitudinal axis of the crossmember, wherein the wall members are arranged parallel to one another.

* * * * *